Jan. 5, 1960 J. W. SCHOLTEN 2,920,144
CIRCUIT ARRANGEMENT RESPONSIVE TO
DIALLING SIGNALS AND THE LIKE
Filed April 1, 1953
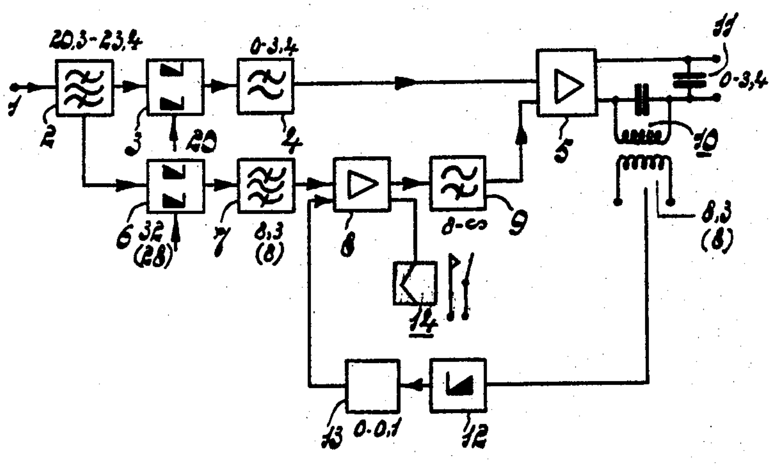
INVENTOR
JACOB WILLEM SCHOLTEN
BY [signature]
AGENT 2,920,144

CIRCUIT ARRANGEMENT RESPONSIVE TO DIALLING SIGNALS AND THE LIKE

Jacob Willem Scholten, Hilversum, Netherlands, assignor, by mesne assignments, to North American Philips Company, Inc., New York, N.Y., a corporation of Delaware Application April 1, 1953, Serial No. 346,094

Claims priority, application Netherlands April 9, 1952

5 Claims. (Cl. 179—84)

The invention relates to circuit arrangements responsive to dialling signals and the like in a carrier-wave telephone system in which the dialling signals lie without the intelligence-frequency band and each intelligence signal is supplied to an associated channel amplifier.

As is known a variety of methods may be used for the transmission of dialling, calling and similar signals in carrier-wave systems. When these dialling signals lie outside the intelligence frequency band, the difficulty arises that either these signals are not amplified by the channel amplifier, as is the case in carrier wave signalling, with the result that the signal amplifier commonly used is required to provide very high amplification, or that in signalling with, for example, 3700 cycles signalling must be stopped behind the channel amplifier, and this is inconvenient in view of the adaptation of the output impedance of the amplifier.

An object of the invention is to provide an improved circuit for receiving carrier-wave telephone signals and in which the received dialling signals are amplified along with the speech intelligence signals in a common amplifier. Another object is to provide a circuit in which intelligence signals and dialling signals are amplified in a common amplifier and are separated from each other in an efficient manner without mutual interference. Other objects will be apparent.

For the sake of clarity it should be noted that when the intelligence-frequency band extends from 300 to 3400 cycles, as is common practice, both signalling with carrier-wave frequency corresponding to 0 or 4000 cycles and signalling with a frequency of, say, 3700 cycles are within the scope of the invention. The dialling carrier-wave frequency must be close to the intelligence carrier-wave frequency band, in order to conserve the available frequency spectrum.

The circuit arrangement according to the invention has for its object to obviate the above described difficulties and is characterized in that the dialling signals are separated from the transmission channel and are shifted in frequency to a frequency farther beyond the intelligence-frequency band with the aid of a modulator and subsequently supplied to a signal amplifier, the output potential of which is supplied to the associated channel amplifier and in that the frequency shifted dialling signals are separated in the output circuit of the channel amplifier and subsequently rectified where upon the rectified potential is supplied to the signal amplifier.

The circuit-arrangement according to the invention will now be described with reference to the accompanying drawing in which one embodiment thereof is shown.

Referring now to the single figure of the drawing, a carrier-wave call which extends from 20.3 to 23.4 kilocycles is received at the point 1 together with the associated carrier-wave dialling signals, which either have a carrier frequency of 20 kilocycles or a frequency of 23.7 kilocycles, corresponding with a signalling frequency of 3.7 kilocycles.

A band-pass filter 2 allows the passage of the intelligence band from 20.3 to 23.4 kilocycles and rejects the dialling signals at least in part.

A demodulator 3 which has a carrier wave at a frequency of 20 kilocycles supplied to it, enables the transmitted intelligence-band to be shifted to the band from 0.3 to 3.4 kilocycles, which band is allowed to pass by a low-pass filter 4, which has a cut-off frequency of 3.4 kilocycles, and is supplied to a channel-amplifier 5.

It should be noted that the low-pass filter 4 rejects the signalling corresponding with 3.7 kilocycles, whilst in carrier wave signalling the carrier wave of the nearest higher channel which corresponds with 4 kilocycles is also rejected and the carrier wave signalling of the channel itself is shifted to zero frequency, with the result that in the usual modulators comprising transformer output this carrier wave signalling is rejected even there.

The signalling signal is taken from the input band-pass filter 2 and supplied to a demodulator 6.

If the signalling frequency is 23.7 kilocycles, a carrier wave at a frequency of 32 kilocycles is supplied to the demodulator 6, with the result that an output signalling frequency of 8.3 kilocycles is set up. If carrier wave signalling corresponding with 20 kilocycles is used, a carrier wave at a frequency of 28 kilocycles is supplied to the demodulator 6 with the result that an output signalling frequency of 8 kilocycles is set up.

A band-pass filter 7 which comprises a circuit tuned to the signalling frequency is connected behind the demodulator 6. The output voltage of the band-pass filter 7 is conducted to a signal amplifier 8 and the amplified signal is supplied to the channel amplifier 5 through a high-pass filter 9, which has a cut off frequency of 8 kilocycles.

A high-pass filter comprising a circuit 10 and a capacitor 11 is included in the output circuit of the channel amplifier 5. Set up across the capacitor 11 is a frequency band from 0 to 3.4 kilocycles and the circuit 10 also acts as a band-pass filter for the separation of the signalling frequency of 8 or 8.3 kilocycles.

The signalling voltage taken from the circuit 10 is supplied to a rectifier 12, where it is detected to provide a direct voltage signal, and through a low-pass filter 13 which has a cut-off frequency of 0.1 kilocycles to the signal amplifier 8 which thus acts as a direct current amplifier, the direct current of the amplifier being varied in a manner such that an alarm or control relay 14, which is included in the output circuit of the amplifier is energized. The amplifier 8 thus amplifies both the A.-C. signalling signal provided from the filter 7, and the D.-C. signal provided from the filter 13. The control relay 14 functions in the usual manner to connect or disconnect the telephone line in response to the beginning or ending of a call, or to sound an alarm when such connections are required.

Since, in signalling, current pulses are produced in the signal amplifier 8, the high-pass filter 9 is included in the output circuit to prevent these switching pulses from being supplied to the channel amplifier 5.

In the circuit arrangement according to the invention the use of a signalling frequency of for example 3.7 kilocycles enables continuous signalling when there is no intelligence transmission, which is of importance for the supervision of the transmission channel, and also enables continuous signalling during the transmission of a call. In the latter case the low-pass filter is required to satisfy more exacting requirements. However, it is also possible to supply a carrier wave of, for example, 36 kilocycles to the demodulator 6 with the result that the signalling frequency is shifted to 12.3 kilocycles, in which case the filters 7, 9 and 10, 11 are obviously required to be modified accordingly.

In conventional continuous signalling the signal level is required to be low to obviate intermodulation in amplifiers and modulators of the carrier wave system, with the result that continuous signalling is hardly possible when carrier wave signalling is used. In contradistinction, both signalling methods described above in accordance with the invention allow signalling during the call.

The new circuit, described above, functions to shift the dialling signal to a new frequency farther away from the intelligence-signal frequency band, whereby the dialling signal and the intelligence signal, which are both amplified in the channel amplifier 5, are less prone to interfere with each other. This reduces the likelihood of intermodulation distortion which otherwise would occur if these two signals were amplified together in amplifier 5 with their original relatively close frequency spacing. The new circuit also permits these two signals to be effectively separated, after amplification, by a simple filter 10—11, whereas a more complicated and expensive separation filter would be required if these signals had their original relatively close frequency spacing. The amplifier 8 is provided in the dialling-signal channel because this signal usually has such a low amplitude level that the extra amplification is required. However, since this signal is also amplified in the amplifier 5, the amplifier 8 need not provide as much gain as would otherwise be necessary.

What is claimed is:

1. A circuit arrangement responsive to dialing signals and the like in a carrier wave telephone system in which the dialing signals lie outside the intelligence frequency band within a transmission channel, comprising a device coupled to said channel to separate said dialing signals from the intelligence wave, a channel amplifier coupled to said device for amplifying the separated intelligence wave yielded therein, frequency-shifting means coupled to said device and responsive to said dialing signals yielded therein to shift the frequency of said separated dialing signals to increase the frequency difference between said separated dialing signals and said intelligence wave, a signal amplifier having an input coupled to said frequency-shifting means to amplify said shifted signals, means coupled to said signal amplifier to apply said amplified shifted signals to the input to said channel amplifier to further amplify the shifted dialing signals in the channel amplifier, means coupled to the output of said channel amplifier to segregate the amplified shifted signals therefrom, means connected to rectify said segregated signals to produce a direct voltage therefrom, means connected to apply said direct voltage as an input to said input of the signal amplifier, and means connected to the output of said signal amplifier to respond to the amplified said direct voltage.

2. A circuit arrangement, as set forth in claim 1, wherein said frequency-shifting means includes a modulator.

3. A circuit arrangement, as set forth in claim 1 wherein said means coupled to said signal amplifier to apply said amplified shifted signals to said channel amplifier includes a high-pass filter having a cut-off frequency below that of the frequency of said amplified shifted signals.

4. A circuit arrangement responsive to dialing signals and the like in a carrier wave telephone system in which the dialing signals lie outside the intelligence frequency band within a transmission channel, comprising a device coupled to said channel to separate said dialing signals from the intelligence wave, a channel amplifier coupled for amplifying the intelligence wave yielded therein, means including a modulator coupled to said device and responsive to said dialing signals yielded therein to shift the frequency of said separated dialing signals to increase the frequency difference between said separated dialing signals and said intelligence waves, a bandpass filter tuned to said shifted signals and coupled to said shifting means, a signal amplifier having an input coupled to said bandpass filter to amplify said shifted signals, a high-pass filter having a cut-off frequency below that of the frequency of said amplified shifted signals, said filter being coupled to said signal amplifier to apply said amplified shifted signals to the input to said channel amplifier to amplify same, means coupled to the output of said channel amplifier to segregate the amplified shifted signals therefrom, a rectifier coupled to said segregating means to rectify said segregated signals to produce a direct voltage therefrom, a low-pass filter having a cutoff frequency of approximately one hundred cycles per second, said low-pass filter being coupled to said rectifier to apply said direct voltage to said input of said signal amplifier to amplify same, and an alarm system connected to the output of said signal amplifier to respond to the amplified said direct voltage.

5. A circuit for amplifying and separating two signals having frequencies relatively close together comprising separating means connected to separate said signals, demodulator means connected to said separating means to demodulate one of said signals, frequency converter means connected to said separating means to convert the frequency of the other of said signals, the demodulated signal and converted signal having a greater frequency difference than the original said two signals, an amplifier, means connecting said amplifier to said demodulator means and to said frequency converter means to amplify simultaneously said demodulated signal and converted signal, and further separating means connected to the output of said amplifier to separate the amplified said demodulated signal and said converted signal, and relay means operatively connected to said further separating means to be responsive only to one of said demodulated and said converted signals.

References Cited in the file of this patent

UNITED STATES PATENTS

| | | |
|---|---|---|
| 2,355,642 | Gose | Aug. 15, 1944 |
| 2,468,555 | Hurault | Apr. 26, 1949 |
| 2,496,784 | Ensink | Feb. 7, 1950 |
| 2,775,647 | Ensink | Dec. 25, 1956 |